(12) United States Patent
Wegerich et al.

(10) Patent No.: US 7,640,145 B2
(45) Date of Patent: Dec. 29, 2009

(54) AUTOMATED MODEL CONFIGURATION AND DEPLOYMENT SYSTEM FOR EQUIPMENT HEALTH MONITORING

(75) Inventors: Stephan W. Wegerich, Geneva, IL (US); Andre Wolosewicz, Woodridge, IL (US); Xiao Xu, Naperville, IL (US); James P. Herzog, Downers Grove, IL (US); Robert Matthew Pipke, Oak Park, IL (US)

(73) Assignee: SmartSignal Corporation, Lisle, IL (US)

( * ) Notice: Subject to any disclaimer, the term of this patent is extended or adjusted under 35 U.S.C. 154(b) by 539 days.

(21) Appl. No.: 11/409,920

(22) Filed: Apr. 24, 2006

(65) Prior Publication Data

US 2007/0005311 A1    Jan. 4, 2007

Related U.S. Application Data

(60) Provisional application No. 60/674,581, filed on Apr. 25, 2005.

(51) Int. Cl.
*G06F 7/60* (2006.01)
*G06F 17/10* (2006.01)

(52) U.S. Cl. .......................................................... 703/2
(58) Field of Classification Search ...................... 703/2
See application file for complete search history.

(56) References Cited

U.S. PATENT DOCUMENTS

| 6,181,975 | B1 * | 1/2001 | Gross et al. | 700/29 |
| 6,331,864 | B1 * | 12/2001 | Barone | 367/128 |
| 6,522,978 | B1 * | 2/2003 | Chen et al. | 702/35 |
| 6,859,739 | B2 * | 2/2005 | Wegerich et al. | 702/32 |
| 2003/0139908 | A1 * | 7/2003 | Wegerich et al. | 702/183 |

OTHER PUBLICATIONS

A. Cavallo, G. DeMaria, E. Leccia, R. Setola, "Robust Vibration Control of a DC9 Aircraft Frame", Proceedings of the 37th IEEE Conference on Decision & Control, Tampa, Florida-Dec. 1998, pp. 4039-4044.*

* cited by examiner

*Primary Examiner*—Paul L Rodriguez
*Assistant Examiner*—Dwin M Craig
(74) *Attorney, Agent, or Firm*—Fitch, Even, Tabin & Flannery

(57) ABSTRACT

A method for systematically configuring and deploying an empirical model used for fault detection and equipment health monitoring. The method is driven by a set of data preprocessing and model performance metrics subsystems that when applied to a raw data set, produce an optimal empirical model.

33 Claims, 4 Drawing Sheets

US 7,640,145 B2

AUTOMATED MODEL CONFIGURATION AND DEPLOYMENT SYSTEM FOR EQUIPMENT HEALTH MONITORING

CROSS-REFERENCE TO RELATED APPLICATIONS

This application claims the benefit of priority under 35 U.S.C. § 119(e) to U.S. Provisional application No. 60/674,581 filed Apr. 25, 2005.

FIELD OF THE INVENTION

The present invention relates to equipment health monitoring, and more particularly to the setup and deployment of model-based equipment health monitoring systems.

BACKGROUND OF THE INVENTION

Recently, new techniques have been commercialized to provide equipment health monitoring and early warning of equipment failure. Unlike prior techniques that depend on a precise physical understanding of the mechanics of the machine's design, these new techniques rely on empirical modeling methods to "learn" normal equipment behavior so as to detect nascent signs of abnormal behavior when monitoring an ailing machine or process. More specifically, such new techniques learn operational dynamics of equipment from sensor data on that equipment, and build this learning into a predictive model. The predictive model is a software representation of the equipment's performance, and is used to generate estimates of equipment behavior in real time. Comparison of the prediction to the actual ongoing measured sensor signals provides for detection of anomalies.

According to one of the new techniques described in U.S. Pat. No. 5,764,509 to Wegerich et al., sensor data from equipment to be monitored is accumulated and used to train an empirical model of the equipment. The training includes determining a matrix of learned observations of sets of sensor values inclusive of sensor minimums and maximums. The model is then used online to monitor equipment health, by generating estimates of sensor signals in response to measurement of actual sensor signals from the equipment. The actual measured values and the estimated values are differenced to produce residuals. The residuals can be tested using a statistical hypothesis test to determine with great sensitivity when the residuals become anomalous, indicative of incipient equipment failure.

While the empirical model techniques have proven to be more sensitive and more robust than traditional physics-based models, allowing even for personalized models specific to individual machines, the development and deployment of the equipment models represents significant effort. Empirical models are not amenable to a complete and thorough elucidation of their function, and so creating properly functioning models is prone to some trial and error. Furthermore, since they are largely data-driven, they can only provide as much efficacy for equipment health monitoring as the data allows. It is often difficult to know ahead of time how well a data-derived model will be able to detect insipient equipment health problems, but it is also unreasonable to await a real equipment failure to see the efficacy of the model. Tuning of an empirical model is also more a matter of art than science. Again, because the model is derived from data, the tuning needs of the model are heavily dependent on the quality of the data vis-à-vis the equipment's dynamic range and the manner in which the equipment can fail. Currently, model-based monitoring systems require significant manual investment in model development for the reasons stated above.

There is a need for means to better automate the empirical modeling process for equipment health monitoring solutions, and to improve the rate of successful model development. What is needed is a means of determining the capabilities of a given data-derived model, and of comparing alternative models. What is further needed is a way of automating deployment of individual data-derived models for fleets of similar equipment without significant human intervention. Furthermore, a means is needed of tuning a model in-line whenever it is adapted without human intervention.

SUMMARY OF THE INVENTION

A method and system is provided for automated measurement of model performance in a data-driven equipment health monitoring system, for use in early detection of equipment problems and process problems in any kind of mechanical or industrial engine or process. The invention enables the automatic development and deployment of empirical model-based monitoring systems, and the models of the monitored equipment they are based on. Accordingly, the invention comprises a number of modules for automatically determining in software the accuracy and robustness of an algorithmic data-driven model, as well as other performance metrics, and deploying a model selected based on such performance metrics, or redesigning said model as necessary.

The invention enables quick deployment of large numbers of empirical models for monitoring large fleets of assets (jet engines, automobiles or power plants, for example), which eases the burden on systems engineers that would normally set up models individually using manually intensive techniques. This results in a highly scalable system for condition based monitoring of equipment. In addition, each model and each variable of every model will have associated with it measures of performance that assess model accuracy, robustness, spillover, bias and minimum detectable shift. The measures can easily be re-calculated at any time if need be to address changes in the model due to adaptation, system changes and anything else that could effect model performance.

BRIEF DESCRIPTION OF THE DRAWINGS

The novel features believed characteristic of the invention are set forth in the appended claims. The invention itself, however, as well as the preferred mode of use, further objectives and advantages thereof, is best understood by reference to the following detailed description of the embodiments in conjunction with the accompanying drawing, wherein:

DETAILED DESCRIPTION OF PREFERRED EMBODIMENTS

Figure 1:
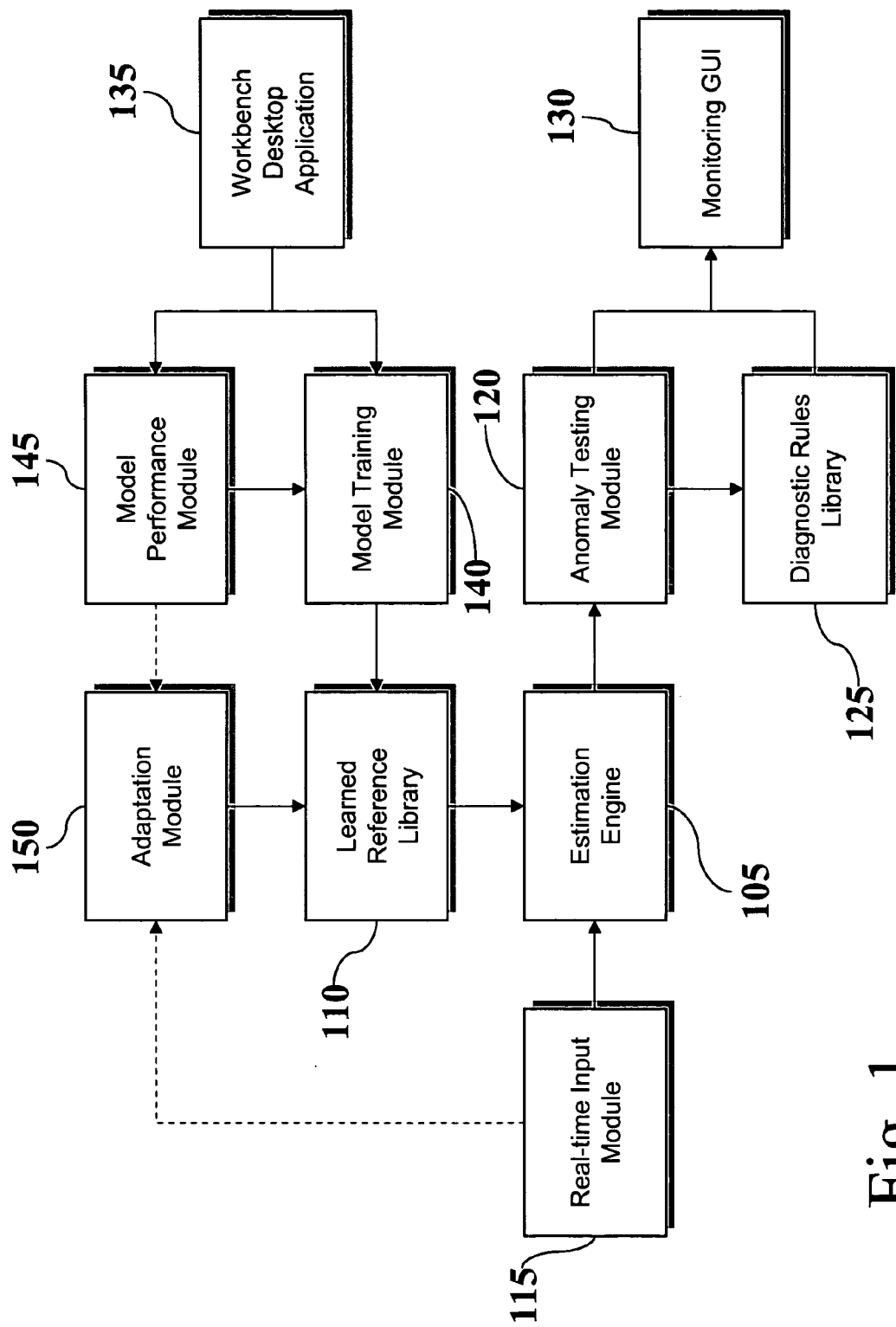
FIG. 1 is a block diagram of the overall system of the present invention.

An equipment health monitoring system according to the invention is shown in FIG. 1 to comprise an estimation engine 105 at its core, which generates estimates based on a model comprising a learned reference library 110 of observations, in response to receiving a new input observation (comprising readings from multiple sensors) via real-time input module 115. An anomaly-testing module 120 compares the inputs to the estimates from estimation engine 105, and is preferably disposed to perform statistical hypothesis tests on the series of such comparisons to detect anomalies between the model prediction and the actual sensor values from a monitored piece of equipment. A diagnostic rules library 125 is provided to interpret the anomaly patterns, and both the anomaly-testing module 120 and the diagnostic rules library 125 provide informational output to a monitoring graphical user interface (GUI) 130, which alerts humans to developing equipment problems.

Separately, a workbench desktop application 135 is used by an engineer to develop the model(s) used by the estimation engine 105. Data representative of the normal operation of equipment to be monitored, such as data from sensors on a jet engine representative of its performance throughout a flight envelope, is used in the workbench 135 to build the model. Model training module 140 converts the data into selected learned reference observations, which comprise the learned reference library 110. A model performance module 145 provides the engineer with measures of model efficacy in the form of accuracy, robustness, spillover, bias and minimum detectable shift, which aids in determining which empirical model to deploy in the learned reference library 110. Model performance module 145 can also be configured to run in real-time to assess model efficacy after an adaptation of the model, which is carried out in real-time by adaptation module 150, responsive to rules that operate on the input data from input module 115. The adaptation module 150 has the ability to update the learned reference library 110, for example, if an input parameter such as an ambient temperature exceeds a previously experienced range learned by the model, and the model needs to accommodate the new extra-range data into its learning.

According to the present invention, the modeling technique can be chosen from a variety of known empirical modeling techniques, or even data-driven techniques that will yet be developed. By way of example, models based on kernel regression, radial basis functions, similarity-based modeling, principal component analysis, linear regression, partial least squares, neural networks, and support vector regression are usable in the context of the present invention. In particular, modeling methods that are kernel-based are useful in the present invention. These methods can be described by the equation:

$$x_{est} = \sum_{i=1}^{L} c_i K(x_{new}, x_i)$$

where a vector $x_{est}$ of sensor signal estimates is generated as a weighted sum of results of a kernel function K, which compares the input vector $x_{new}$ of sensor signal measurements to multiple learned snapshots of sensor signal combinations, $x_i$. The kernel function results are combined according to weights $c_i$, which can be determined in a number of ways. The above form is an "autoassociative" form, in which all estimated output signals are also represented by input signals. This contrasts with the "inferential" form in which certain output signal estimates are provided that are not represented as inputs, but are instead inferred from the inputs:

$$\hat{y} = \sum_{i=1}^{L} c_i K(x_{new}, x_i)$$

where in this case, y-hat is an inferred sensor estimate. In a similar fashion, more than one sensor can be simultaneously inferred.

In a preferred embodiment of the invention, the modeling technique used in the estimation engine 105 is similarity based modeling, or SBM. According to this method, multivariate snapshots of sensor data are used to create a model comprising a matrix D of learned reference observations. Upon presentation of a new input observation $X_{in}$ comprising sensor signal measurements of equipment behavior, autoassociative estimates $x_{est}$ are calculated according to:

$$x_{est} = D \cdot (D^T \otimes D)^{-1} \cdot (D^T \otimes x_{in})$$

or more robustly:

$$x_{est} = \frac{D \cdot (D^T \otimes D)^{-1} \cdot (D^T \otimes x_{in})}{\sum ((D^T \otimes D)^{-1} \cdot (D^T \otimes x_{in}))}$$

where the similarity operator is signified by the symbol $\otimes$, and can be chosen from a number of alternative forms. Generally, the similarity operator compares two vectors at a time and returns a measure of similarity for each such comparison. The similarity operator can operate on the vectors as a whole (vector-to-vector comparison) or elementally, in which case the vector similarity is provided by averaging the elemental results. The similarity operator is such that it ranges between two boundary values (e.g., zero to one), takes on the value of one of the boundaries when the vectors being compared are identical, and approaches the other boundary value as the vectors being compared become increasingly dissimilar.

An example of one similarity operator that may be used in a preferred embodiment of the invention is given by:

$$s = e^{-\frac{|x_{in} - x_i|}{h}}$$

where h is a width parameter that controls the sensitivity of the similarity to the distance between the input vector $x_{in}$ and the example vector $x_i$. Another example of a similarity operator is given by:

$$s = \frac{1}{N} \sum_{i=1}^{N} \left( \left[ 1 + \frac{[(_A x_i - _B x_i)/R_i]^\lambda}{C} \right]^{-1} \right)$$

where N is the number of sensor variables in a given observation, C and $\lambda$ are selectable tuning parameters, $R_i$ is the expected range for sensor variable i, and the elements of vectors $_A x$ and $_B x$ corresponding to sensor i are treated individually.

Further according to a preferred embodiment of the present invention, an SBM-based model can be created in real-time with each new input observation by localizing within the learned reference library 110 to those learned observations with particular relevance to the input observation, and constituting the D matrix from just those observations. With the next input observation, the D matrix would be reconstituted from a different subset of the learned reference matrix, and so on. A number of means of localizing may be used, including nearest neighbors to the input vector, and highest similarity scores.

The possibility of generating data-driven models introduces the problem that some models perform better than others derived from the same data, or from similar data. Optimally, the best model is deployed to monitor equipment, and to this end, the present invention provides the model performance module 145 for generating metrics by which the best model can be automatically deployed.

To measure the performance of a modeling technique, several performance metrics are used. The main objective of the model in the context of fault detection is to reliably detect shifts in modeled parameters. Therefore the accuracy of a model is not always the best measure of the performance of the model. A more comprehensive set of performance metrics are needed to assess a model's ability to detect deviations from normality in addition to the accuracy of the model. To accomplish this, a set of performance metrics is defined according to the invention. These metrics measure the accuracy, robustness, spillover, bias and minimum detectable shift for a given model.

Individual Variable Modeling Accuracy—This is a measure of the accuracy of the autoassociative and/or inferential model for each variable in each group of variables for each test data set. Accuracy is calculated for each variable using a normalized residual Root Mean Square (RMS) calculation ($acc_p$). This is calculated by dividing the Root Mean Square (RMS) of the residual for each variable ($rms_p$) by the standard deviation of the variable itself ($\sigma_p$). A smaller $acc_p$ corresponds to a higher accuracy. This metric tends to favor overfitting, and therefore must be assessed with a corresponding robustness measurement. The accuracy measurement for each variable is calculated according to:

$$acc_p = \frac{rms_p}{\sigma_p}$$

Overall Model Accuracy—The overall accuracy for each model containing M modeled output variables, is generated by:

$$ACC = \frac{1}{M}\sum_{p=1}^{M} acc_p$$

and the spread in accuracy is given by the standard deviation of $acc_i$:

$$ACC_{std} = \sqrt{\frac{1}{M-1}\sum_{p=1}^{M}(acc_p - ACC)^2}$$

Individual Variable Modeling Robustness—This is a measurement of the ability of the model to detect disturbances in each one of the modeled variables. When a fault occurs in a monitored system, it usually (but not always) manifests itself in more than one of the modeled variables. In order to realistically measure robustness, one must accurately simulate fault scenarios and then assess robustness for each variable expected to show deviations from normality. Unfortunately, this is a very impractical approach. To overcome the impracticality, a disturbance is added to each individual variable. If the amount of reference data permits, disturbances are introduced in non-overlapped windows throughout the length of the available reference dataset. The robustness for each variable is then calculated in the corresponding disturbance window. In this way, robustness for all variables may be calculated in one pass. This approach assumes that the length of the reference data set is $L \geq W*M$, where W is the window size and M is the number of variables to be tested in the model. If this is not the case, the disturbance is added M separate times and the analysis is done separately for each variable.

Figure 2:
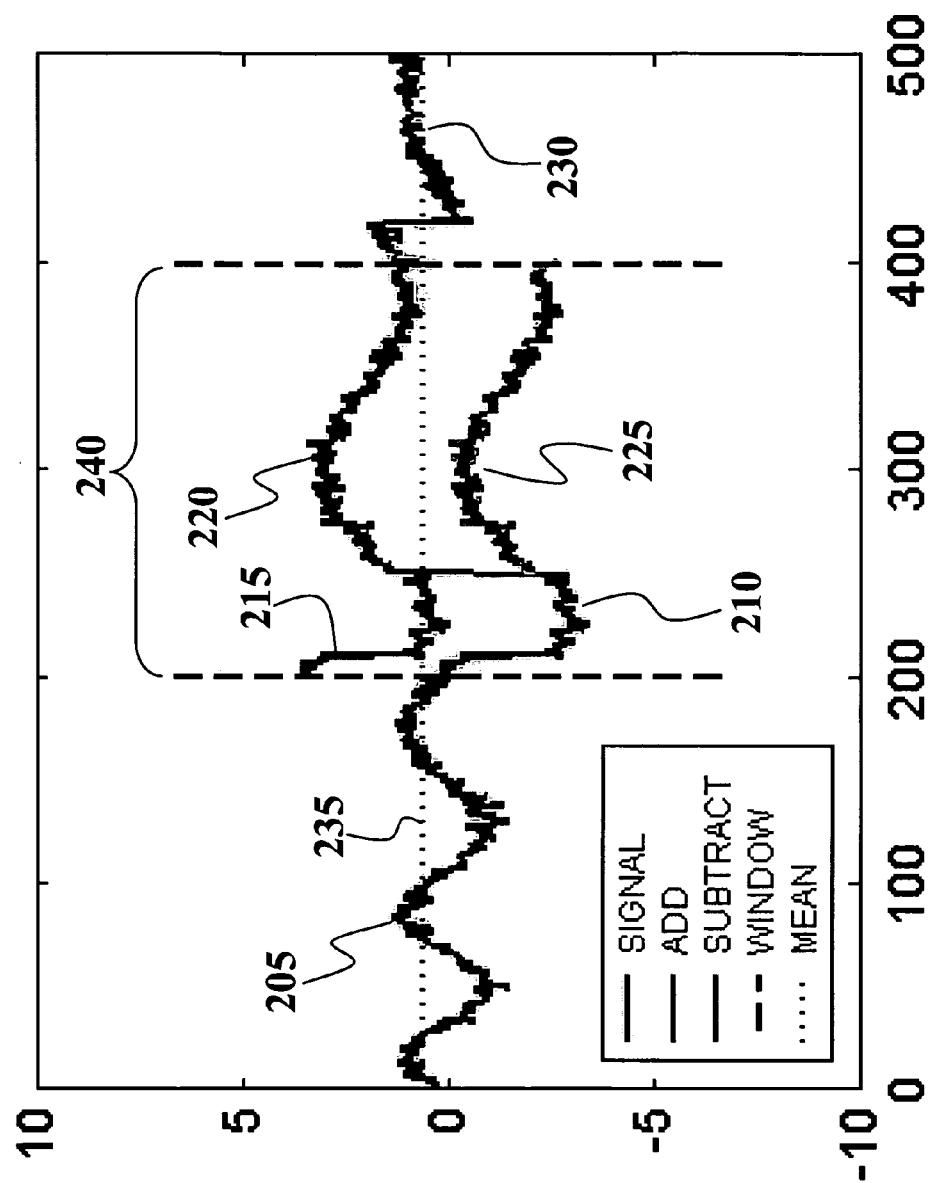
FIG. 2 is a chart showing a method for perturbing data according to the invention for the measurement of robustness.

Measuring robustness—Add or subtract a constant amount from each sample of the windowed region of data depending on if the sample is below or above the mean of the signal respectively. The amount to add (or subtract) is typically ½ the range of the variable, so that the disturbance is usually very close to being within the normal data range. Turning to FIG. 2, this method is shown in a chart, wherein is plotted a sample signal as might be found in a reference data set from which in part a model is derived (along with other signals not shown). The signal 205 comprises some step function segments 210, 220 and 230, as might occur when the equipment being monitored shifts between control modes (e.g., gears or set points). The signal 205 has a mean value 235 across all its values in the chart. In a window of perturbation 240, the signal is perturbed as described above, such that for the segment 210 of the original signal, which is below the mean, the perturbed signal 215 is generated by adding a constant. For the segment 220, which is above the mean, the perturbed signal 225 is generated by subtracting a constant.

Both the original set of reference data as well as the data with perturbations is input to the candidate model, and estimates are generated. The objective is to see how badly the model estimates are influenced by the perturbed data, especially in view of how well the model makes estimates when the data is pristine. To calculate the robustness metric for each variable the following equation is used:

$$rob = \frac{\sum_{i=1}^{N_A} A(i) + \sum_{j=1}^{N_S} S(j)}{(N_A + N_S)\Delta}$$

Here, the A(i)s are the estimates of the input with the disturbance minus the estimates without the disturbance for the samples with the added disturbances; and the S(j)s are the estimates without the disturbance minus the estimates with the disturbance for the samples with the subtracted disturbances. $N_A$ and $N_S$ are the number of samples with added and subtracted disturbances respectively, and $\Delta$ is the size of the disturbance. Ideally, rob should be equal to 0, meaning that the estimate with the disturbance is equal to the estimate without the disturbance, and the model is extremely robust in the face of anomalous input. If the value of rob is 1 or greater, the estimate is either completely following the disturbance or overshooting it.

Figure 3:
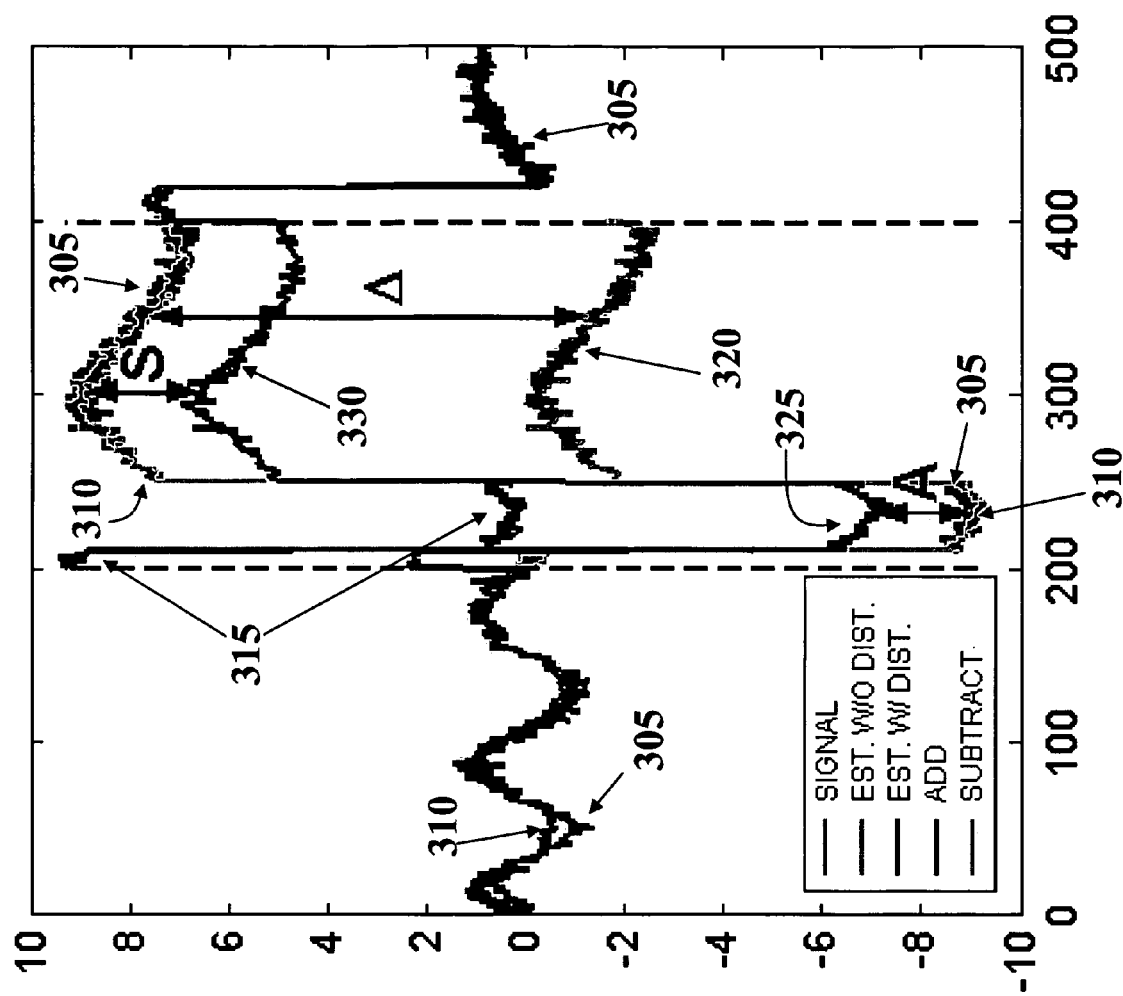
FIG. 3 is a chart showing measurements that are used in the robustness calculation according to the present invention.

FIG. 3 graphically illustrates how these components of the robustness calculation are defined. The original signal 305 is estimated without disturbance to provide unperturbed estimate 310. The positive perturbation 315 and the negative perturbation 320 tend to bias the estimates 325 and 330 of each, respectively. The differences between the positively perturbed signal estimates 325 and the unperturbed estimates 310 provide A, while the difference between the negatively perturbed signal estimates 330 and the unperturbed estimates 310 give rise to S. The size of the perturbation is Δ.

Overall Model Robustness—The overall robustness is just the average of the individual modeled variable robustness measurements over variables p and the spread in robustness is given by the standard deviation of the individual robustness measurements.

$$ROB = \frac{1}{M}\sum_{p=1}^{M} rob_p$$

$$ROB_{std} = \sqrt{\frac{1}{M-1}\sum_{p=1}^{M}(rob_p - ROB)^2}$$

Spillover—This measures the relative amount that variables in a model deviate from normality when another variable is perturbed. In contrast to robustness, spillover measures the robustness on all other variables when one variable is perturbed. Importantly, this metric is not calculated in the case of an inferential model, where perturbation of an input (an independent parameter) would not be expected to meaningfully impact an output in terms of robustness, since the outputs are entirely dependent on the inputs. The spillover measurement for each variable is calculated using a normalized RMS calculation ($spr_{p|q}$), which is given by:

$$spr_{p|q} = \frac{\text{rms}(\hat{x}_{p|norm_q} - \hat{x}_{p|pert_q})}{\sigma_p} \quad p=1, 2, \ldots M, \quad p \neq q$$

where $\hat{x}_{p|norm_q}$ is the estimate for variable p when variable q is normal and $\hat{x}_{p|pert_q}$ is the estimate when variable q is disturbed. The overall spillover incurred by other (p=1,2,...,M, p≠q) model variables due to a disturbed variable q is the averaged individual spillover measurements:

$$Spr_q = \frac{1}{M-1}\sum_{p \neq q} spr_{p|q}$$

Overall spillover—The overall spillover metric for a model is given by:

$$SPR = \frac{1}{M}\sum_{q=1}^{M} Spr_q.$$

Model Bias—This metric gives a measure of the constant difference between the model estimate and actual data above and below the mean of the data. It is calculated for each variable using the following formula:

$$Bias_p = \frac{\text{median}(|X_p - \hat{X}_p|)}{\sigma_p}$$

Here, $X_p$ is a vector of samples for the input variable p, $\hat{X}_p$ is a vector of corresponding estimates for that input variable and $\sigma_p$ is the standard deviation of the $X_p$. The model bias metric is calculated on unperturbed, normal data.

Minimum Detectable Shift—The minimum detectable shift that can be expected for each variable is given by:

$$Mds_p = rob_p + \sigma_p \times Bias_p.$$

Figure 4:
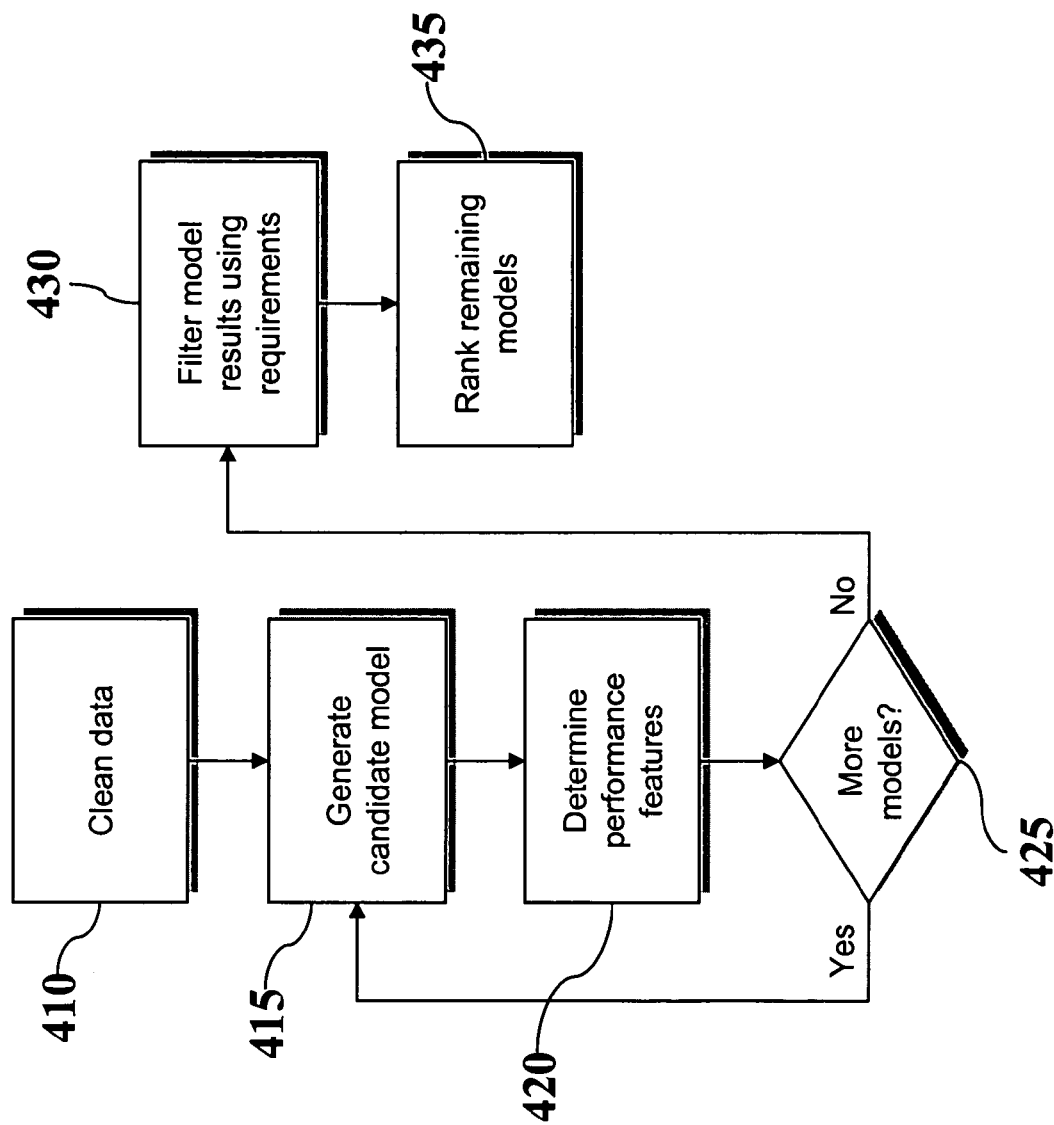
FIG. 4 is a flowchart showing a methodology for automatically generating and selecting for deployment a data-driven model according to the model metrics of the invention.

Turning to FIG. 4, a method for automatically selecting a model for deployment from a set of generated candidate models is shown. In step 410, the reference data is filtered and cleaned. In step 415, a model is generated from the data. Models can vary based on tuning parameters, the type of model technology, which variables are selected to be grouped into a model, or the data snapshots used to train the model, or a combination. In step 420, the model metrics described herein are computed for the model. In step 425, if more models are to be generated, the method steps back to step 415, otherwise at step 430 the models are filtered according to their model metrics to weed out those that do not meet minimum criteria, as described below. In step 435, the remaining models are ranked according to their metrics, and a top rank model is selected for deployment in the equipment health monitoring system. All of these steps can be automated in software to be performed without human intervention. Alternatively, some aspects of some or all of these steps can include human intervention as desired, e.g., during data cleaning a human engineer may want to peruse the data to identify bad data, or during model generation each model is configured by a human.

A rule set may be used to operate on the model metrics to determine which candidate model to deploy as the optimal model. The rule set can be implemented as software in the model performance module 145. According to one preferred embodiment, the monitoring system of the present invention is provided with identification of which model variables are considered "performance" variables, that is, the sensors that are watched most closely for expected signs of failure known to a domain expert for the subject equipment. Further, the inventive system is supplied with the desired target levels of minimum detectable shift on those variables. These performance variables will often be a subset of the available sensors, and the challenge is to identify a group of sensors inclusive of the performance variables which optimally models the performance variables and provides best fault detection based on them. At the model filtering stage 430, these requirements are used to determine whether each model meets or fails the requirements. If a model cannot detect the minimum desired detectable shift for a performance variable, it is eliminated as a candidate. Once the models have been thus filtered, they are ranked in step 435 according to the rule set operating on the model metrics as desired by the user. For example, once a model has met the minimum desired detectable shift requirements for certain performance variables, the models may be ranked on accuracy alone, and the most accurate model selected for deployment. As an alternative example, the rule set may specify that a ranking be made for all models according to each of their model metrics. Their ranks across all metrics are averaged, and the highest average ranking selects for the model to be deployed. As yet another example, further criteria on rank may be applied, such that the highest average ranking model is chosen, so long as that model is never ranked in the bottom quartile for any given metric. In yet another embodiment, some of or all of the model metrics may be combined in a weighting function that assigns importance to each metric, to provide an overall model score, the highest scoring model being the model selected for deployment.

What is claimed is:

1. A method for implementing a monitoring system for monitoring equipment health, comprising the steps of:
generating a first empirical model from reference data representing a piece of equipment;
generating a second empirical model from the reference data;
generating at least one performance metric for said first empirical model including intentionally adding a disturbance to at least one variable;
generating at least one performance metric for said second empirical model including intentionally adding a disturbance to at least one variable;
upon comparing the at least one performance metrics from said first and said second empirical models, selecting one of them to use for monitoring the piece of equipment.

2. A method according to claim 1, wherein the at least one performance metric is selected from the set comprising a measure of robustness, a measure of spillover, and a measure of minimum detectable shift.

3. A method according to claim 2, wherein the at least one performance metric is a measure of robustness.

4. A method according to claim 3, wherein said measure of robustness comprises:
providing a set of multivariate, normal test data samples representative of normal operation of said piece of equipment;
adding the disturbance to at least one variable of at least some of said normal test data samples for forming disturbed normal test data;
generating estimates with each said empirical model of normal test data;
generating estimates with each said empirical model of said disturbed normal test data; and
for each said empirical model, differencing the estimates of said disturbed normal test data with the estimates of said normal test data to determine a measure of robustness for each disturbed variable.

5. A method according to claim 4, further comprising the steps of determining an overall model robustness for each said empirical model by combining said measures of robustness for every disturbed variable in each said empirical model.

6. A method according to claim 4, wherein the measure of robustness for a disturbed variable is determined by summing the absolute values of all differences between estimates for disturbed normal test data and estimates for normal test data for the disturbed variable, and dividing the sum by the quantity of the count of all disturbed samples multiplied by the disturbance size.

7. A method according to claim 6, wherein for each sample of said disturbed normal test data, a disturbance is added to at most one variable.

8. A method according to claim 6, wherein said first empirical model is a kernel based model.

9. A method according to claim 8, wherein said first empirical model is a similarity-based model.

10. A method according to claim 2, wherein the at least one performance metric is a measure of spillover.

11. A method according to claim 10, wherein said measure of spillover comprises:
providing a set of multivariate, normal test data samples representative of normal operation of said piece of equipment;
adding the disturbance to at least one variable of at least some of said normal test data samples for forming disturbed normal test data;
generating estimates with each said empirical model of normal test data;
generating estimates with each said empirical model of said disturbed normal test data; and
for each said empirical model, differencing the estimates of at least one other variable for said disturbed normal test data with the estimates of the other variable for said normal test data, determining normalized Root Mean Square (RMS) for said differences, and dividing by a measure of variance in the disturbed variable absent the disturbance, to determine a measure of impact on the other variable for the disturbed variable.

12. A method according to claim 11, further comprising averaging measures of impact across all other variables for the disturbed variable to provide a measure of spillover for said disturbed variable.

13. A method according to claim 2, wherein the at least one performance metric is a measure of minimum detectable shift.

14. A method according to claim 13, wherein said measure of minimum detectable shift comprises:
providing a set of multivariate, normal test data samples representative of normal operation of said piece of equipment;
adding the disturbance to at least one target variable of at least some of said normal test data samples for forming disturbed normal test data;
generating estimates with each said empirical model of normal test data;
generating estimates with each said empirical model of said disturbed normal test data;
for each said empirical model, differencing the estimates of said disturbed normal test data with the estimates of said normal test data to determine a measure of robustness for the target variable;
determining a bias in estimates for the target variable;
determining a measure of variance for the target variable; and
determining a minimum detectable shift for the target variable equivalent to the measure of robustness for the target variable plus the quantity of the estimate bias for the target variable multiplied by the measure of variance in the target variable.

15. A method according to claim 14, wherein said first empirical model is a kernel-based model.

16. A method according to claim 15, wherein said first empirical model is a similarity-based model.

17. An apparatus for determining the performance of a model based monitoring system for monitoring equipment health, comprising:
a processor for executing computer code;
a memory for storing reference data and test data representative of a piece of equipment;
a first computer code module disposed to cause said processor to generate a model of said piece of equipment from said reference data;
a second computer code module disposed to cause said processor to use said model to generate normal estimates of said test data; and
a third computer code module disposed to cause said processor to intentionally add a disturbance value to one variable per sample, for at least some of the samples comprising said test data, generate an estimate of each such sample, compare the estimate to the corresponding one of said normal estimates for said test data, and generate a model performance metric therefrom.

18. An apparatus according to claim 17, wherein said model performance metric is a measure of robustness.

19. An apparatus according to claim 18, wherein said third computer code module is further disposed to cause said processor to sum the absolute values of all differences between estimates for a variable with the disturbance value and estimates for the same variable without the disturbance value, and divide the sum by the quantity of the count of all samples wherein that variable was disturbed multiplied by the disturbance value.

20. An apparatus according to claim 17, wherein said model performance metric is a measure of spillover.

21. An apparatus according to claim 20, wherein said third computer code module is further disposed to cause said processor to determine a spillover from a first variable to a second variable by subtracting the estimates of said second variable for samples in which said first variable has the disturbance value added to it, from the estimates of said second variable in the same samples when no disturbance value has been added to any variable of such samples, determining a normalized Root Mean Square (RMS) for the resulting differences, and dividing by a measure of variance of said first variable.

22. An apparatus according to claim 17, wherein said model performance metric is a measure of minimum detectable shift.

23. An apparatus according to claim 22, wherein said third computer code module is further disposed to cause said processor to determine a bias in estimates for a target variable, determine a measure of variance for the target variable, and determine a minimum detectable shift for the target variable equivalent to a measure of robustness for the target variable plus the quantity of the estimate bias for the target variable multiplied by the measure of variance in the target variable.

24. An apparatus according to claim 17, wherein said model is a kernel-based model.

25. An apparatus according to claim 24, wherein said model is a similarity-based model.

26. A method for implementing a monitoring system for monitoring equipment health, comprising the steps of:
generating a first empirical model from reference data representing a piece of equipment;
generating a second empirical model from the reference data;
generating at least one measure of spillover for said first empirical model, comprising:
providing a set of multivariate, normal test data samples representative of normal operation of said piece of equipment,
adding a disturbance to at least one variable of said normal test data samples for forming disturbed normal test data,
generating estimates with each said empirical model of normal test data,
generating estimates with each said empirical model of disturbed normal test data,
for each said empirical model, differencing the estimates of at least one other variable for said disturbed normal test data with the estimates of the other variable for said normal test data,
determining normalized Root Mean Square (RMS) for said differences, and
dividing by a measure of variance in the disturbed variable absent the disturbance, to determine a measure of impact on the other variable for the disturbed variable;
generating at least one measure of spillover for said second empirical model; and
upon comparing the at least one measure of spillover from said first and said second empirical models, selecting one of them to use for monitoring the piece of equipment.

27. A method according to claim 26, further comprising averaging measures of impact across all other variables for the disturbed variable to provide a measure of spillover for said disturbed variable.

28. A method for implementing a monitoring system for monitoring equipment health, comprising the steps of:
generating a first empirical model from reference data representing a piece of equipment;
generating a second empirical model from the reference data;
generating at least one measure of minimum detectable shift for said first empirical model, comprising:
providing a set of multivariate, normal test data samples representative of normal operation of said piece of equipment,
adding a disturbance to at least one target variable of said set of normal test data, over at least some of said normal test data samples, to form disturbed normal test data,
generating estimates with each said empirical model of said normal test data,
generating estimates with each said empirical model of said disturbed normal test data,
for each said empirical model, differencing the estimates of said disturbed normal test data with the estimates of said normal test data to determine a measure of robustness for the target variable,
determining a bias in estimates for the target variable,
determining a measure of variance for the target variable, and
determining a minimum detectable shift for the target variable equivalent to the measure of robustness for the target variable plus the quantity of the estimate bias for the target variable multiplied by the measure of variance in the target variable;
generating at least one measure of minimum detectable shift for said second empirical model; and
upon comparing the at least one performance metrics from said first and said second empirical models, selecting one of them to use for monitoring the piece of equipment.

29. A method according to claim 28, wherein said first empirical model is a kernel-based model.

30. A method according to claim 29, wherein said first empirical model is a similarity-based model.

31. An apparatus for determining the performance of a model based monitoring system for monitoring equipment health, comprising:
a processor for executing computer code;
a memory for storing reference data and test data representative of a piece of equipment;
a first computer code module disposed to cause said processor to generate a model of said piece of equipment from said reference data;
a second computer code module disposed to cause said processor to use said model to generate normal estimates of said test data; and
a third computer code module to generate a robustness metric by being disposed to cause said processor to:
add a disturbance value to one variable per sample, for at least some of the samples comprising said test data, generate an estimate of each such sample, compare the estimate to the corresponding one of said normal estimates for said test data, sum the absolute values of all differences between estimates for a variable with the disturbance value and estimates for the same variable without the disturbance value, and divide the sum by the quantity of the count of all samples wherein that variable was disturbed multiplied by the disturbance value.

32. An apparatus for determining the performance of a model based monitoring system for monitoring equipment health, comprising:

a processor for executing computer code;

a memory for storing reference data and test data representative of a piece of equipment;

a first computer code module disposed to cause said processor to generate a model of said piece of equipment from said reference data;

a second computer code module disposed to cause said processor to use said model to generate normal estimates of said test data; and a third computer code module to generate a spillover metric by being disposed to cause said processor to:

add a disturbance value to one variable per sample, for at least some of the samples comprising said test data, generate an estimate of each such sample, compare the estimate to the corresponding one of said normal estimates for said test data, determine a measure of spillover from a first variable to a second variable by subtracting the estimates of said second variable for samples in which said first variable has the disturbance value added to it, from the estimates of said second variable in the same samples when no disturbance value has been added to any variable of such samples, determining a normalized Root Mean Square (RMS) for the resulting differences, and dividing by a measure of variance of said first variable.

33. An apparatus for determining the performance of a model based monitoring system for monitoring equipment health, comprising:

a processor for executing computer code;

a memory for storing reference data and test data representative of a piece of equipment;

a first computer code module disposed to cause said processor to generate a model of said piece of equipment from said reference data;

a second computer code module disposed to cause said processor to use said model to generate normal estimates of said test data; and a third computer code module disposed to cause said processor to:

add a disturbance value to one variable per sample, for at least some of the samples comprising said test data, generate an estimate of each such sample, compare the estimate to the corresponding one of said normal estimates for said test data, determine a bias in estimates for a target variable, determine a measure of variance for the target variable, and determine a minimum detectable shift for the target variable equivalent to a measure of robustness for the target variable plus the quantity of the estimate bias for the target variable multiplied by the measure of variance in the target variable.

* * * * *

UNITED STATES PATENT AND TRADEMARK OFFICE
CERTIFICATE OF CORRECTION

PATENT NO. : 7,640,145 B2 Page 1 of 1
APPLICATION NO. : 11/409920
DATED : December 29, 2009
INVENTOR(S) : Wegerich et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 788 days.

Signed and Sealed this

Ninth Day of November, 2010

David J. Kappos
*Director of the United States Patent and Trademark Office*